United States Patent
Baba

(10) Patent No.: US 7,982,443 B1
(45) Date of Patent: Jul. 19, 2011

(54) DC TO DC VOLTAGE CONVERTER WITH STACKED SYNCHRONOUS BUCK CONVERTERS

(75) Inventor: David Simon Baba, Tucson, AZ (US)

(73) Assignee: National Semiconductor Corporation, Santa Clara, CA (US)

( * ) Notice: Subject to any disclaimer, the term of this patent is extended or adjusted under 35 U.S.C. 154(b) by 565 days.

(21) Appl. No.: 12/122,528

(22) Filed: May 16, 2008

(51) Int. Cl.
   *G05F 1/59* (2006.01)
(52) U.S. Cl. .................................... 323/271; 323/282
(58) Field of Classification Search .......... 323/271, 323/282, 351
   See application file for complete search history.

(56) References Cited

U.S. PATENT DOCUMENTS

| | | | | |
|---|---|---|---|---|
| 5,886,508 | A * | 3/1999 | Jutras | 323/267 |
| 6,903,537 | B2 | 6/2005 | Tzeng et al. | |
| 7,009,849 | B2 | 3/2006 | Ramabhadran et al. | |
| 7,061,214 | B2 | 6/2006 | Mayega et al. | |
| 7,511,463 | B2 * | 3/2009 | Kumar | 323/267 |
| 7,629,779 | B2 * | 12/2009 | Kumar et al. | 323/267 |
| 7,795,849 | B2 * | 9/2010 | Sohma | 323/271 |
| 2004/0000895 | A1 * | 1/2004 | Solivan | 323/271 |
| 2006/0133121 | A1 * | 6/2006 | Uguen | 363/59 |
| 2009/0033289 | A1 * | 2/2009 | Xing et al. | 320/140 |

OTHER PUBLICATIONS

Chakraborty, Sombuddha et al., "A Novel Converter Topology for Multiple Individually Regulated Outputs," IEEE Transactions on Power Electronics, Mar. 2006, 21(2):361-369.

* cited by examiner

*Primary Examiner* — Jeffrey L Sterrett

(57) ABSTRACT

A circuit for converting voltages is provided. The circuit includes a switch circuit coupled in series with an input node and a reference node. The switch circuit includes at least three controllable switches coupled in series and an inductive low pass output stage coupled to a connecting node between each of the switches. Each output stage is configured to output an average of the voltage generated at the connecting node. The circuit also includes a control circuit coupled to the controllable switches. The control circuit is configured to generate a plurality of control signals for control nodes of the switches, where the control signals have a plurality of complementary periodic components. Each of the complementary periodic components alternates a predetermined combination of the switches for alternating a voltage at each connecting node between a voltage at the input node and a voltage at the reference node.

20 Claims, 4 Drawing Sheets

Time/mSecs            200μSecs/div

US 7,982,443 B1

DC TO DC VOLTAGE CONVERTER WITH STACKED SYNCHRONOUS BUCK CONVERTERS

FIELD OF THE INVENTION

The present invention relates to voltage conversion, and, in particular, to DC to DC voltage conversion.

BACKGROUND

The function of a DC to DC voltage converter is to provide one or more predetermined and substantially constant output voltages in response to an input voltage. Voltage converters can include converters for providing output voltages greater than the input voltage (step-up converters) and converters for providing output voltages less than the input voltage (step-down converters). In the case of step-down converters, a basic method to reduce a DC voltage is to use a voltage divider circuit. However voltage dividers waste energy, since they operate by bleeding off excess voltage as heat. Furthermore, such output voltages typically are unregulated. Another method of reducing a DC voltage is to use a buck converter. Although buck converters generally require a more complex topology and a driver circuit, they are typically more efficient and self-regulating. These operating characteristics make buck converters useful for voltage conversion tasks for many applications, including integrated circuits.

One type of buck converter, a synchronous buck converter, has become increasing popular due to its increased efficiency over a standard buck converter topology. In a synchronous buck converter, the diode typically found in the standard topology is replaced with a second switch. The switches in a synchronous buck converter are typically implemented as MOS transistors having a low initial source-drain resistance to reduce conduction losses, improving efficiency of the synchronous buck converter. However, this modification generally results in increased costs due to the typical higher costs of the MOS transistors and the increase complexity required in a driver circuit for the switches. Consequently, when multiple regulated output voltages are required, at least two switches typically need to be provided for each output voltage, resulting in increased costs for the additional switches.

BRIEF DESCRIPTION OF THE DRAWINGS

Non-limiting and non-exhaustive embodiments of the present invention are described with reference to the following drawings, in which.

DESCRIPTION OF THE EMBODIMENTS

Figure 1:
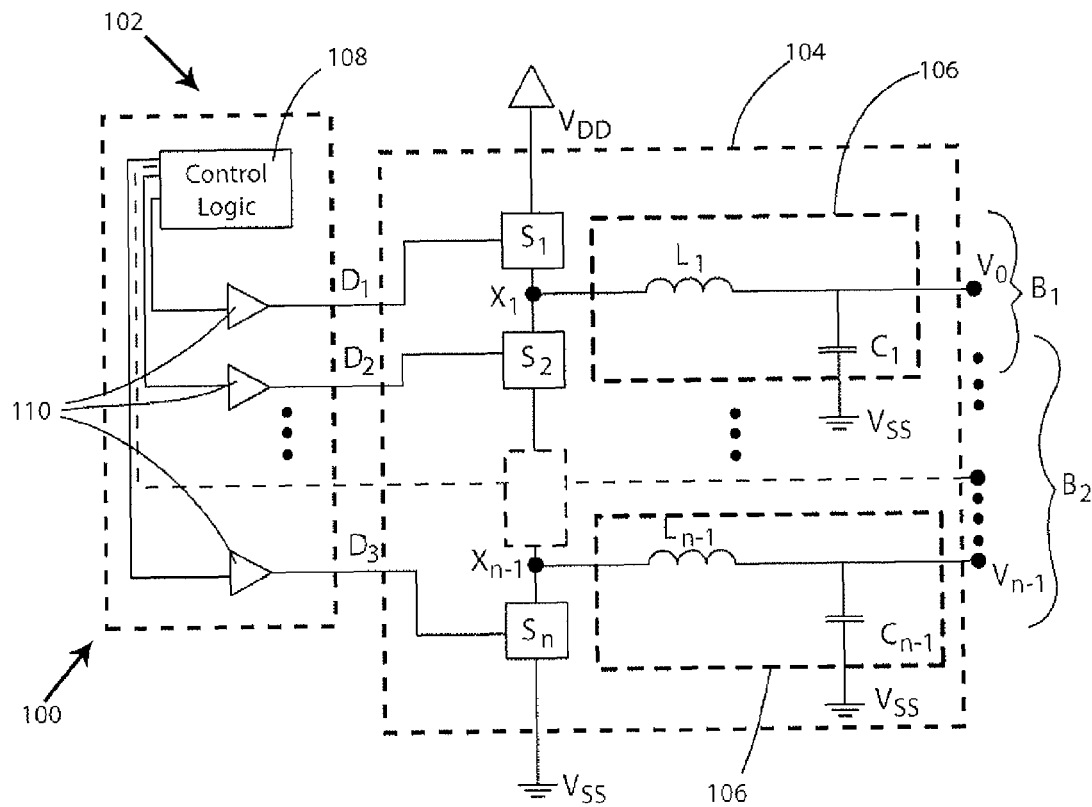
FIG. 1 illustrates a schematic diagram of an embodiment of a DC to DC voltage converter.

Various embodiments of the invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the invention.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" includes plural reference, and the meaning of "in" includes "in" and "on." The phrase "in one embodiment," as used herein does not necessarily refer to the same embodiment, although it may. Similarly, the phrase "in some embodiments," as used herein, when used multiple times, does not necessarily refer to the same embodiments, although it may.

As used herein, the term "or" is an inclusive "or" operator, and is equivalent to the term "and/or," unless the context clearly dictates otherwise. The term "based, in part, on", "based, at least in part, on", or "based on" is not exclusive and allows for being based on additional factors not described, unless the context clearly dictates otherwise. The term "coupled" means at least either a direct electrical connection between the items connected, or an indirect connection through one or more passive or active intermediary devices. The term "circuit" means at least either a single component or a multiplicity of components, either active and/or passive, that are coupled together to provide a desired function. The term "signal" means at least one current, voltage, charge, temperature, data, or other signal. Where either a field effect transistor (FET) or a bipolar junction transistor (BJT) may be employed as an embodiment of a transistor, the scope of the words "gate", "drain", and "source" includes "base", "collector", and "emitter", respectively, and vice versa.

The present invention is related to circuits, systems, and methods for converting an input DC voltage to a plurality of DC voltages. The input DC voltage can be converted using a system or circuit having at least three switch devices coupled in series between an input node and a reference node. In operation, the switch devices are controlled by generating a plurality of control signals at control nodes of the switches, where the control signals have a plurality of complementary periodic components. Each of the complementary periodic components alternates a predetermined combination of the switches, which alternates a voltage at each connecting node between a voltage at the input node and a voltage at the reference node. The connecting nodes are coupled to inductive low pass stages to output an average observed voltage at each of the connecting nodes.

FIG. 1 shows a block diagram of an embodiment of a DC converter 100 according to the present invention. DC converter 100 includes a control circuit 102 and a switch circuit 104. The control circuit 102 can include control logic 108 for generating the control signals and output driver circuits 110 for producing conditioned control signals D1, D2, . . . , Dn (collectively Dx) by amplifying, filtering, or otherwise conditioning the signals from control logic 108. The switch circuit 104 can include three or more switch devices S1, S2, . . . , Sn, (collectively Sx) connected in series between a voltage supply node VDD and a reference voltage node VSS. In some embodiments, the switch devices Sx can be implemented as field effect transistors (FET) or bipolar junction transistors. The switch devices Sx can be further configured to receive conditioned control signals Dx at control nodes.

Accordingly, the driver circuits 110 can be configured to provide control signals Dx at sufficient levels to operate the particular type of switch device and alternate between a current blocking and a current conducting state.

The switch circuit 104 can further include inductive low pass output stages 106 connected to connecting nodes X1 . . . Xn between the switches. In the various embodiments of the present invention, the output stages 106 can have any low pass filter topology including inductive components. However, in some embodiments, the output stages 106 can each have a buck output stage topology that forms a synchronous buck converter with two of switches Sx. That is, a typical low pass RC filter topology in which the resistor is replaced with an inductor. For example, as shown in FIG. 1, each output stage 106 can include an inductor L1 . . . Ln−1 and a capacitor C1 . . . Cn−1 connected in series between each of the connecting nodes X1 . . . Xn and a reference voltage Vss. The output voltages V0 . . . Vn−1 of the stages are then the voltages measured across the capacitors C1 . . . Cn−1. The use of a buck output stages not only provides a low pass filter to generate a DC voltage from the switches, but also enables a constant voltage to be output during a steady state condition as long as the synchronous buck converters operate in a continuous mode.

The combination of switches Sx and buck output stages 106 forms a series of synchronous buck converters. That is, a synchronous buck converter B1 is formed by the combination of switches S1 and S2, inductor L1, and capacitor C1. Similarly, assuming n=3, a synchronous buck converter B2 is formed by the combination of switches S2 and Sn, inductor Ln−1, and capacitor Cn−1. Therefore, a series of stacked synchronous buck converters is provided, where each of the synchronous buck converters in the stack shares at least one switch with neighboring synchronous buck converter in the stack. This results in n−1 voltages being generated using n switches, as compared to the 2n−2 switches typically required using conventional methods.

A synchronous buck converter generally operates by alternating the closure of the first and second switches by providing complementary control signals. That is, providing control signals to the first and second switches that are 180° out of phase. To provide a continuous voltage, the synchronous converter can be operated in a continuous mode by switching at a high frequency (i.e., switching time is less than the commutation time of the buck output stage). Although this generates a high frequency input voltage for the buck output stage, the low pass filter nature of the buck output stage outputs a voltage that is approximately the average of the generated high frequency voltage, weighted by the duty cycle of the control signals. Accordingly, a pair of switches for a synchronous buck converter can be configured to produce any output voltage less than an input voltage by providing using a pair of high frequency complementary periodic signals with an appropriate duty cycle.

However, as previously described, the synchronous buck converters B1 and B2 in circuit 100 are not separate and any control signals applied to a common switch of converters B1 and B2, such as switch S2, can affect operation of both converters B1 and B2. Therefore, in the various embodiments of the present invention, the control logic 102 is configured to generate a plurality of control signals for the switch circuit 104 having various periodic complementary components. The various periodic complementary components alternate the voltages at each of the connecting nodes X1 . . . Xn−1 between VDD and VSS, each with different duty cycle, to provide a plurality of output voltages.

For example, in the case of n=3, the circuit 100 in FIG. 1 would have 3 switch devices, S1, S2, and Sn for alternating voltages at X1 and Xn−1 and outputting low frequency voltages V1 and Vn−1. To provide V1, the switch circuit would require that the closure of S1 be alternated with the concurrent closure of S2 and Sn. Similarly, to provide Vn−1, the switch circuit would require the concurrent closure of S1 and S2 to be alternated with the closure of Sn. In the various embodiments of the present invention, these combinations of closures can be provided by including periodic components associated with each set of closures, where each set of closures is associated with a different frequency of closure. Furthermore, these frequencies are selected to maintain the buck converters in a continuous mode of operation to provide a fixed output voltage. Accordingly, for the example above, a first periodic component at a first frequency can be associated with alternating the closure of S1 versus the closure of S2 and Sn and a second periodic component at a different frequency can be associated with the closure of Sn versus the closure of S1 and S2. The two sets of complementary signals can then be combined to provide the signal needed. That is the control signal for a switch is the product of the various periodic functions associated output stages the switch is associated with. Furthermore, in addition to a different frequency of operation, different duty cycles can be provided for each of the periodic components so that different voltages can be output.

Although it is within the scope of the present invention to provide a different frequency of operation for each set of closures, the complexity of the control circuit is significantly increased if it is necessary to provide a unique frequency for each set of closures. Therefore, in some embodiments, frequencies can be assigned to sets of closures more selectively to allow a single frequency to be used for more than one set of closures. That is, periodic components can be assigned to different combinations of switches in a nested fashion. That is, a periodic component having a first frequency is associated with a first and second group of switches associated with one of the buck output stages. A second periodic component having a second frequency greater than the first frequency is then assigned for the combination of switches associated with a buck output stage located within the first group of switches and also to the combination of switches associated with a buck output stage located within the second group of switches. However, because the final control signal is product of both the first and second periodic components, the lower frequency signal prevents overlapping of switching between adjunct groups of switches associated with different sets of closures. This concept is illustrated with respect to FIG. 2.

Figure 2:
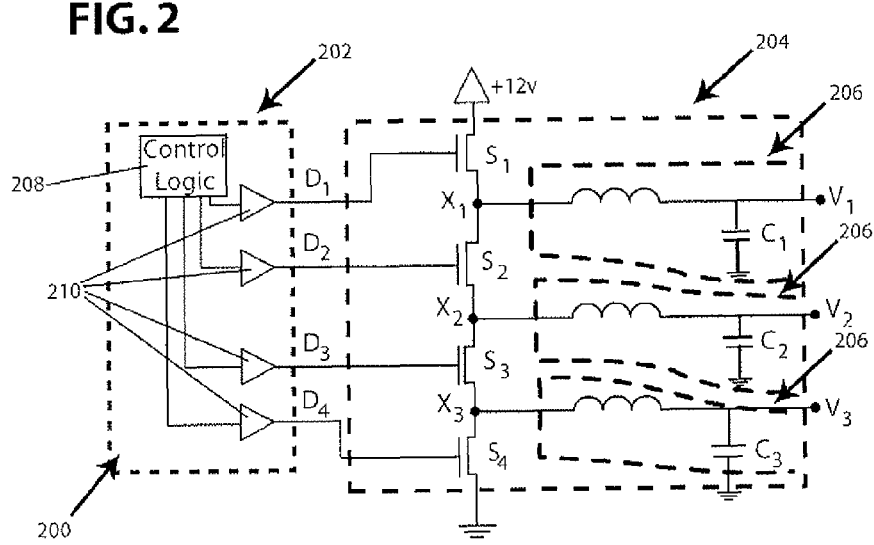
FIG. 2 illustrates a schematic diagram of another embodiment of a DC to DC voltage converter.

FIG. 2 shows a block diagram of a circuit 200 for converting a 12V input voltage to three output voltages V1, V2, and V3. Similar to FIG. 1, FIG. 2, shows a circuit 200 having a control circuit 202 and a switch circuit 204. The control circuit 202 can include control logic 202 and drivers 210 for generating control signals D1, D2, D3, and D4, as previously described for FIG. 1. The switch circuit 204 includes switches S1, S2, S3, and S4 connected in series between a 12V source and ground. In FIG. 2, switches S1, S2, S3, and S4 are implemented as NMOS field effect transistors. However, the circuit 200 can be also implemented using PMOS or bipolar transistors. The switch circuit 204 also includes buck output stages 206, each connected to connecting nodes X1, X2, X3, as previously described.

As previously described, the voltages at V1, V2, and V3 can be generated using control signals having three periodic components with three different frequencies. However, by assigning frequencies in a nested fashion the voltages at V1, V2, and V3 can be generated using two frequencies.

Figure 3A:
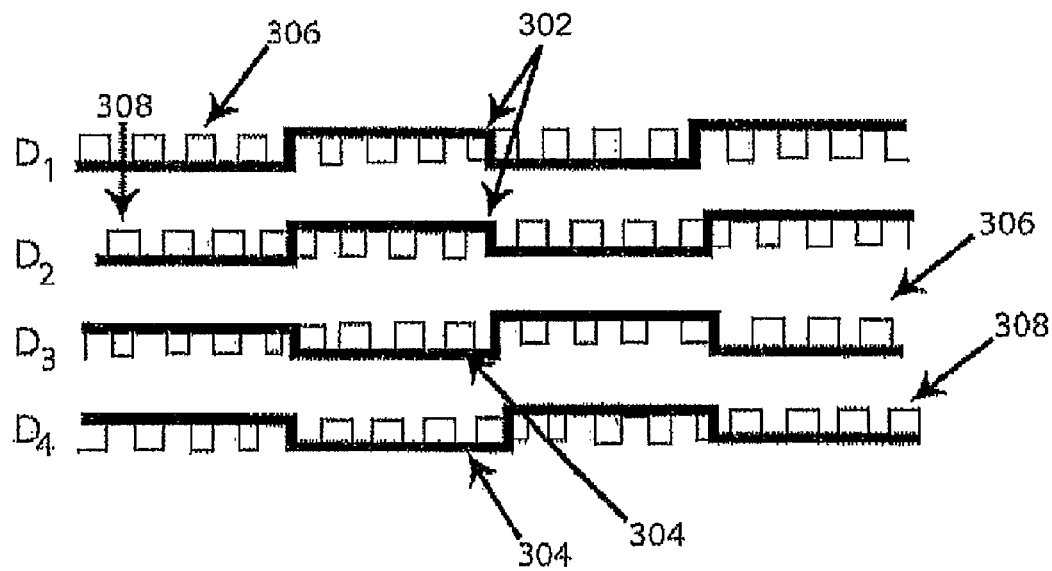
FIG. 3A graphically illustrates the various periodic components in the control signals for the DC to DC voltage converter in FIG. 2.
Figure 3B:
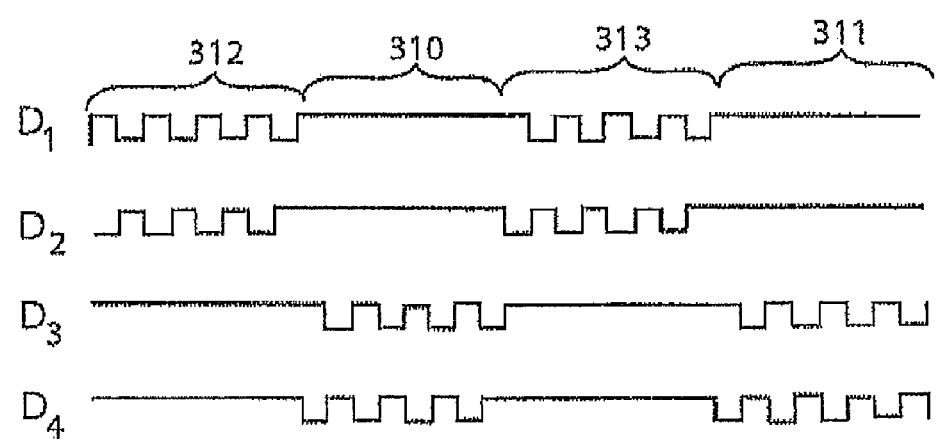
FIG. 3B graphically illustrates a control signal timing diagram for the DC to DC voltage converter in FIG. 2.
Figure 3C:
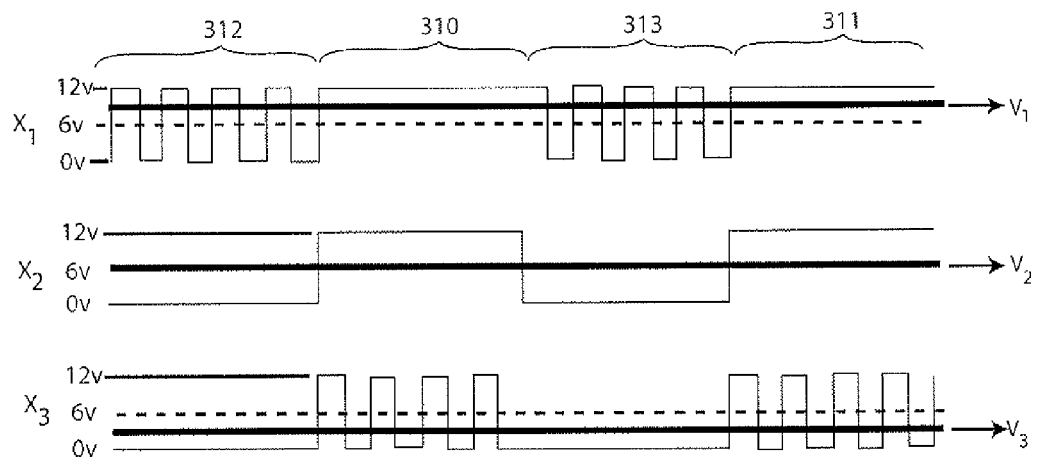
FIG. 3C graphically illustrate input and output voltages for the buck output stages of the DC to DC voltage converter in FIG. 2.

First, a low frequency periodic component can be assigned for generating the voltage V2. This is illustrated in FIG. 3A by the periodic complementary pair of control signal components 302 and 304. This pair of control signals results in alternating the closure of switches S1 and S2 with the closure of switches S3 and S4, alternating the voltage at connecting node X2 between 12V (S1, S2 are closed during periods 310, 311) and 0V (S3, S4 are closed during periods 312, 313), as shown in FIG. 3C. In the example in FIG. 3B, the duty cycle for this pair of control signals is approximately 50%. Consequently, the buck output stage 206, operating as a low pass filter, provides the average of the two voltages and results in a steady state voltage for V2 of ~6V, as shown in FIG. 3C.

Second, a higher frequency component can be assigned for generating the voltage V1. This is illustrated by the addition of complementary periodic components 306 and 308 to control signals D1 and D2, respectively. The resulting product of the first periodic component 302 and second periodic components 306, 308 for D1 and D2 is shown in FIG. 3B. Although the control signals D1 and D2 include a higher frequency component during periods 312 and 313, as shown in FIG. 3B, the voltage at V2 is not significantly affected. Because complementary signals are used for additional switching of S1 and S2, during periods 312 and 313 switches S1 and S2 are not concurrently closed at the same time switches S3 and S4 are closed. Accordingly, node X2 remains at or close to 0V during these time periods. Furthermore, during time periods 310 and 311, the higher frequency signals also do not significantly affect the voltage at V2. Because the control signals D1 and D2 are the product of the high and low frequency periodic components, the low frequency component effectively cancels the higher frequency component during periods 310 and 311 and switches S1 and S2 remain closed throughout these time periods.

The result of these control signals is alternating the closure of switches S1 and S2 during periods 312 and 313, alternating the voltage at connecting node X1 between 12V and 0V. However, during periods 310, 311, S1 and S2 are both closed and the voltage at connecting node X1 is continuously 12V. These resulting voltages for X1 are shown in FIG. 3C. In the example in FIGS. 3B and 3C, the duty cycle for both the high frequency and low frequency components is approximately 50%. Accordingly, the voltage at connecting node X1 is ~12V for approximately 75% of the time and 0V for the remainder of the time. Consequently, the buck output stage 206 coupled to connecting node X1, operating as a low pass filter, provides the average voltage at X1, resulting in a steady state voltage for V1 of ~9V, as shown in FIG. 3C.

The voltage at V3 is similarly generated. As with the voltage at V1, a periodic component having a higher frequency than the periodic component for V2, can be used for generating the voltage at V3. This is illustrated by the inclusion of complementary periodic components 306 and 308 for control signals D3 and D4, respectively. The product of these first and second periodic components for D3 and D4 is shown in FIG. 3B. As described above, although the control signals D3 and D4 include a higher frequency component during periods 310 and 311, as shown in FIG. 3B, the voltage at V2 is also not significantly affected. Because complementary signals are also used for additional switching of S3 and S4, during periods 310 and 311 switches S3 and S4 are not both closed at the same time switches S1 and S2 are closed. Accordingly, node X2 remains at or close to 12V during these time periods. Furthermore, during time periods 312 and 313, the higher frequency signals also do not significantly affect the voltage at V2. Because the control signals D3 and D4 are the product both the high and low frequency periodic components, the low frequency component effectively cancels the higher frequency component. As a result, during time periods 312 and 313, the low frequency component dominates and switches S3 and S4 remain closed.

The result of these control signals, including the high and low frequency components, is the alternating of the closure of switches S3 and S4 when switches S1 and S2 are closed during periods 310 and 311. This also produces an alternating voltage at connecting node X3 between 12V and 0V. However, during periods 312 and 313, S3 and S4 are both closed and the voltage at connecting node X3 is 0V. These alternating and continuous voltages for X3 are shown in FIG. 3C. As for D1 and D2 in the example in FIG. 3B, the duty cycle for both the high frequency and low frequency components of D3 and D4 is also approximately 50%. Accordingly, the voltage at connecting node X3 is ~0V for approximately 75% of the time and ~12V for the remainder of the time. Consequently, the buck output stage 206 coupled to connecting node X3, operating as a low pass filter, provides the average voltage at X3 and results in a steady state voltage for V3 of ~3V, as shown in FIG. 3C.

As shown in FIGS. 3A and 3B, the same higher frequency signals 306 and 308 can be applied to the control signals for the additional switching in switches S1, S2, S3, and S4. This is because the lower frequency signal dominates the control signals these switches, as described above. Consequently, when additional switching of switches S3 and S4 is occurring during time periods 310 and 311, no additional switching of switches S1 and S2 occurs due to the complementary low frequency signal dominating the control signal for switches S1 and S2. Similarly, when additional switching of switches S1 and S2 is occurring during time periods 312 and 313, no additional switching of switches S3 and S4 occurs due to the low frequency signal dominating the control signal for switches S3 and S4 and keeping switches S3 and S4 closed.

Figure 3D:
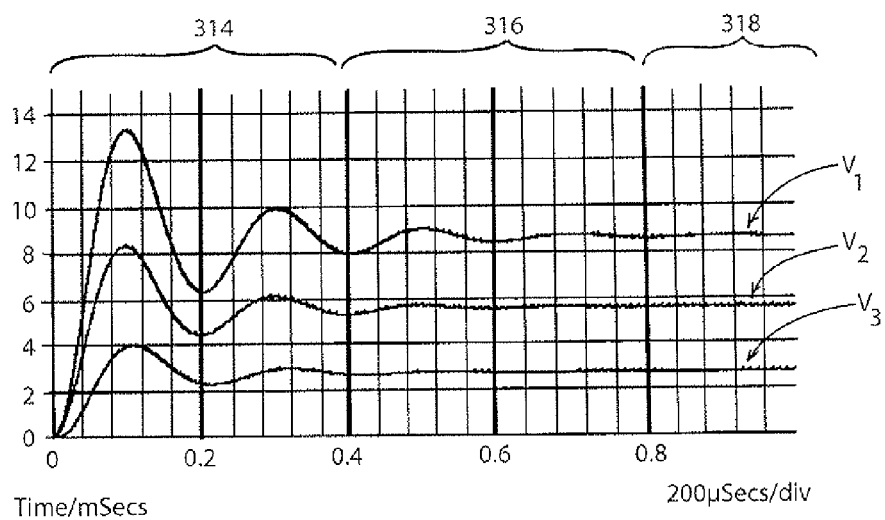
FIG. 3D graphically illustrates voltage versus time curves for the DC to DC voltage converter in FIG. 2.
Figure 4:
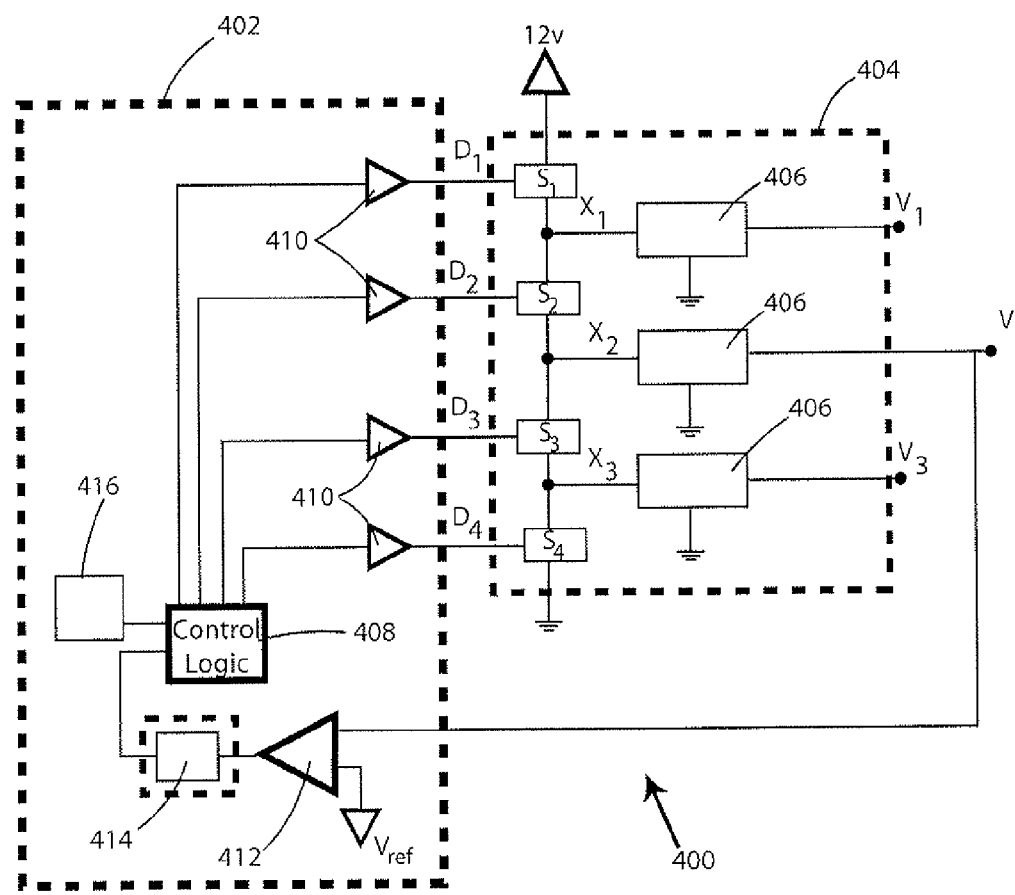
FIG. 4 illustrates a schematic diagram of yet another embodiment of a DC to DC voltage converter.

The actual output at V1, V2, and V3 for the example above is shown in FIG. 3D. As shown in FIG. 3D, some amount of ringing occurs due to the initial variation of voltages occurring as the switches S1 . . . S4 go through initial cycles of switching and the active components of the buck output stages 206 (inductors and capacitors) are initially charged (period 314). As the switching continues, the various synchronous buck output stages begin to approach a steady-state or continuous mode (period 316) and the amount of ringing is reduced. Finally, once all buck output stages are operating in a continuous mode (period 318), steady-state output are produced at V1, V2, and V3. Although the signals generated by the stack of synchronous buck converters provide a series of stable steady state DC voltages, in some embodiments, one or more of the output signals may need to be regulated to provide an exact voltage level for a particular application. In such embodiments, the DC converter can include voltage regulation components. For example, as shown in FIG. 4, a circuit 400 for converting an input voltage to three output voltages V1, V2, and V3 can have a control circuit 402 and a switch circuit 404. As with circuits 100 and 200, the control circuit 402 can include control logic 402 and drivers 410 for generating control signals D1, D2, D3 and D4, as previously described in FIG. 2. The switch circuit 404 includes switches S1, S2, S3, and S4 connected in series between a 12V input voltage and a 0V reference voltage. The switch circuit 204 also includes low pass inductive output stages 406 each connected to connecting nodes X1, X2, X3, as previously described.

In order to provide regulation of at least one of the voltages at V1, V2, or V3, the output of one of these nodes can be fed back into the control circuit 402. In FIG. 4, the voltage at V2 is fed back to control circuit 402. In the control circuit, the voltage at V2 can be first compared to a reference voltage Vref using a comparator 412 to generate an error signal. In some embodiments, Vref can be a fixed voltage, generated internally or externally. In other embodiments, Vref can be adjustable and also generated internally or externally. After the error signal is generated by the comparator 412, the error signal can be conditioned using a conditioning element 414 to provide a signal in a form required by the control logic 408. In some embodiments, the error signal can instead be directly provided to the control logic 408. Regardless of how the error signal is received by the control circuit 408, the control logic 408 can use the error signal to adjust the duty cycle for at least one of the periodic components of the control signals. For example, in the case of regulation of the voltage at V2 initially using the set of control signals in FIG. 3B, if Vref is 40% of VDD, the duty cycle for the low frequency component can be adjusted so that switches S1 and S2 are closed 40% of the time and switches S3 and S4 are closed 60% of the time. The control logic 408 can determine the correct duty cycle adaptively until the error signal indicates that the Vref has been matched or a lookup table can be provided in a memory element 416 that provides control signal levels that should be generated in response to an error signal.

In the various embodiments of the present invention, the shift in the duty cycle of the low frequency component can impact the other output voltages at V1 and V3. For example, if the low frequency component duty cycle is adjusted to provide a 40% duty cycle for switches S1 and S2, then 40% of the time the voltage at X1 will be 12V. Assuming that the duty cycle for the high frequency component still remains at 50%, during ½ of the 60% of the remaining time the voltage will be at 12V and 0V during other ½ of the 60% of the remaining time. Accordingly, the resulting voltage V1 would be (0.4× 12V)+(0.3×12V)+(0.3×0V)=~8.4V, rather than the previous ~9V being generated. The voltage at V3 would be similarly impacted, resulting in a voltage at V3 of ~2.4V, rather than the previous ~3V being generated. Therefore, in some embodiments, some adjustment of the duty cycle for other periodic components can be provided to maintain the other voltages at particular voltage levels, either directly or indirectly.

In the case of directly regulated voltages, additional error signal generating components can be include in control circuit 402, coupled to the other output voltages to be regulated. Accordingly, the control circuit 402 can receive a plurality of error signals and determine how to adjust the duty cycle of both low and high frequency components to regulate the multiple voltages. In the case of indirectly regulated voltages, the control logic 408, based on the adjustment of the duty cycle to be made for the regulated voltage, can adjust the duty cycle for the other voltages based on the error signal for the monitored voltage. In the example above, in order to adjust the voltages at V1 and V3 back to their original output voltages, after adjusting the duty cycle for the complementary low frequency components to 40% and 60%, the duty cycle of each of high frequency complementary components 306 and 308 can be set to ~58% and ~42%, respectively, to provide ~9V and ~3V. In such embodiments, the control logic can also utilize a lookup table in a memory element to determine the appropriate adjustment for the other voltages.

The above specification, examples and data provide a description of the manufacture and use of the composition of the invention. Since many embodiments of the invention can be made without departing from the spirit and scope of the invention, the invention also resides in the claims hereinafter appended.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the following claims.

What is claimed is:

1. A circuit for converting voltages, the circuit comprising:
   a switch circuit coupled in series with an input node and a reference node, the switch circuit comprising:
      at least three controllable switches coupled in series between the input node and the reference node, and
      a plurality of inductive low pass output stages, each inductive low pass output stage coupled to a corresponding connecting node between a corresponding pair of the controllable switches, each inductive low pass output stage configured to output an average of the voltage generated at the corresponding connecting node; and
   a control circuit coupled to the controllable switches, wherein:
      the control circuit is configured to generate a plurality of control signals for control nodes of the controllable switches, the control signals associated with a plurality of complementary periodic components having a plurality of frequencies; and
      each of the complementary periodic components is configured to alternately close a predetermined combination of the controllable switches to alternate a voltage at each connecting node between a voltage at the input node and a voltage at the reference node.

2. The circuit of claim 1, wherein:
   control signals associated with a complementary periodic component having a first frequency are configured to alternately close a first group and a second group of the controllable switches, the first group and the second group associated with a first of the connecting nodes;
   control signals associated with a periodic complementary component having a second frequency are configured to alternately close a first subgroup and a second subgroup of the controllable switches in the first group, the first subgroup and the second subgroup associated with a second of the connecting nodes; and
   the second frequency is greater than the first frequency.

3. The circuit of claim 2, wherein:
   control signals associated with a periodic complementary component having a third frequency are configured to alternately close a third subgroup and a fourth subgroup of the controllable switches in the second group, the third subgroup and the fourth subgroup associated with a third of the connecting nodes; and
   the third frequency is greater than the first frequency.

4. The circuit of claim 3, wherein the second frequency and the third frequency are substantially equal.

5. The circuit of claim 1, comprising N inductive low pass output stages and N+1 controllable switches.

6. The circuit of claim 1, wherein a duty cycle of each of the complementary periodic components is 50%.

7. The circuit of claim 1, wherein the control circuit is configured to:
   monitor at least one output of at least one of the inductive low pass output stages; and adjust a duty cycle of at least one of the complementary periodic components responsive to the at least one monitored output.

8. The circuit of claim 1, wherein each of the inductive low pass output stages comprises a buck output stage.

9. The circuit of claim 1, wherein each of the controllable switches comprises a field effect transistor.

10. A method for converting voltages, the method comprising:
receiving an input voltage and a reference voltage at input and reference nodes of a switch circuit having at least three controllable switches coupled in series;
generating a plurality of control signals, the control signals associated with a plurality of complementary periodic components having a plurality of frequencies, each of the complementary periodic components alternately closing a predetermined combination of the controllable switches to generate an alternating voltage at a connecting node between the combination of controllable switches, each of the generated voltages alternating between the input voltage and the reference voltage; and
outputting a plurality of output voltages, each of the output voltages comprising an average of one of the generated voltages.

11. The method of claim 10, wherein:
control signals associated with a complementary periodic component having a first frequency alternately close a first group and a second group of the controllable switches, the first group and the second group associated with a first of the connecting nodes;
control signals associated with a periodic complementary component having a second frequency alternately close a first subgroup and a second subgroup of the controllable switches in the first group, the first subgroup and the second subgroup associated with a second of the connecting nodes; and
the second frequency is greater than the first frequency.

12. The method of claim 11, wherein:
control signals associated with a periodic complementary component having a third frequency alternately close a third subgroup and a fourth subgroup of the controllable switches in the second group, the third subgroup and the fourth subgroup associated with a third of the connecting nodes; and
the third frequency is greater than the first frequency.

13. The method of claim 10, further comprising:
monitoring at least one of the output voltages; and
adjusting a duty cycle of at least one of the complementary periodic components responsive to the at least one monitored output voltage.

14. A system for converting voltages, the system comprising:
at least three controllable switches coupled in series between an input voltage source and a reference voltage source;
a plurality of buck output stages, each of the buck output stages coupled to a corresponding connecting node between two of the controllable switches, each of the buck output stages configured to output an average of a voltage generated at the corresponding connecting node; and
a control circuit coupled to the controllable switches, wherein:
the control circuit is configured to generate a plurality of control signals for control nodes of the controllable switches, the control signals associated with a plurality of complementary periodic components having a plurality of frequencies;
each of the complementary periodic components is configured to alternately close a predetermined combination of the controllable switches to alternate a voltage at each connecting node between a voltage from the input voltage source and a voltage from the reference voltage source; and
each of the complementary periodic components has a period smaller than a commutation time of at least one of the buck output stages.

15. The system of claim 14, wherein:
control signals associated with a complementary periodic component having a first frequency are configured to alternately close a first group and a second group of the controllable switches, the first group and the second group associated with a first of the connecting nodes;
control signals associated with a periodic complementary component having a second frequency are configured to alternately close a first subgroup and a second subgroup of the controllable switches in the first group, the first subgroup and the second subgroup associated with a second of the connecting nodes; and
the second frequency is greater than the first frequency.

16. The system of claim 15, wherein:
control signals associated with a periodic complementary component having a third frequency are configured to alternately close a third subgroup and a fourth subgroup of the controllable switches in the second group, the third subgroup and the fourth subgroup associated with a third of the connecting nodes; and
the third frequency is greater than the first frequency.

17. The system of claim 16, wherein the second and third frequencies are substantially equal.

18. The system of claim 14, further comprising N inductive low pass output stages and N+1 controllable switches.

19. The system of claim 14, wherein a duty cycle of each of the complementary periodic components is 50%.

20. The system of claim 14, wherein the control circuit is configured to:
monitor at least one output of at least one of the inductive low pass output stage; and
adjust a duty cycle of at least one of the complementary periodic components responsive to the at least one monitored output.

* * * * *